United States Patent [19]

Bouwman

[11] 4,168,458

[45] Sep. 18, 1979

[54] METHOD AND APPARATUS FOR DETECTING, SIGNALLING, AND SORTING INACCURATELY FORMED ARTICLES PRODUCED BY A TOOL MACHINE

[75] Inventor: Johannes E. Bouwman, Helmond, Netherlands

[73] Assignee: Nedschroef Octrooi Maatschappij N.V., Helmond, Netherlands

[21] Appl. No.: 862,182

[22] Filed: Dec. 19, 1977

[30] Foreign Application Priority Data

Dec. 20, 1976 [NL] Netherlands .......................... 7614129
Sep. 2, 1977 [NL] Netherlands .......................... 7709677

[51] Int. Cl.² .......................................... G05B 19/28
[52] U.S. Cl. .................................... 318/603; 318/565
[58] Field of Search ............................... 318/603, 565

[56] References Cited

U.S. PATENT DOCUMENTS

| | | | |
|---|---|---|---|
| 3,139,570 | 6/1964 | Jacobson et al. ..................... | 318/603 |
| 3,414,785 | 12/1968 | Orahood et al. ..................... | 318/603 |
| 3,585,376 | 6/1971 | Toscano ............................... | 318/603 |

*Primary Examiner*—B. Dobeck
*Attorney, Agent, or Firm*—Pennie & Edmonds

[57] ABSTRACT

A method and apparatus are disclosed for detecting, signalling and sorting inaccurately formed articles produced by a tool machine which machine has a first relatively stationary machining element and a second movable machining element cooperating with the stationary machining element. A rotatable pulse generator rotated by any suitable drive portion of the tool machine is used to generate pulses, the number of which is proportional to the movement of the movable machining element. The number of pulses generated between the starting and stopping of the movable machine element are counted and compared to preset lower and upper limits. A logic circuit then emits a signal to a power amplifier and a reject switch if the counted number of pulses falls outside of the lower and upper limits that have been preset. The reject switch may either shut down part or all of the machine or operate a gate in a chute through which the article must pass and directs the same to the reject bin if the same is inaccurately formed. Additionally, a statistical control is provided to count the number of inaccurately formed articles in any given production run and if the proportion of inaccurately formed articles exceeds a preselected amount then, in that event, the operator is given a signal or the machine is shut down automatically or both.

8 Claims, 21 Drawing Figures

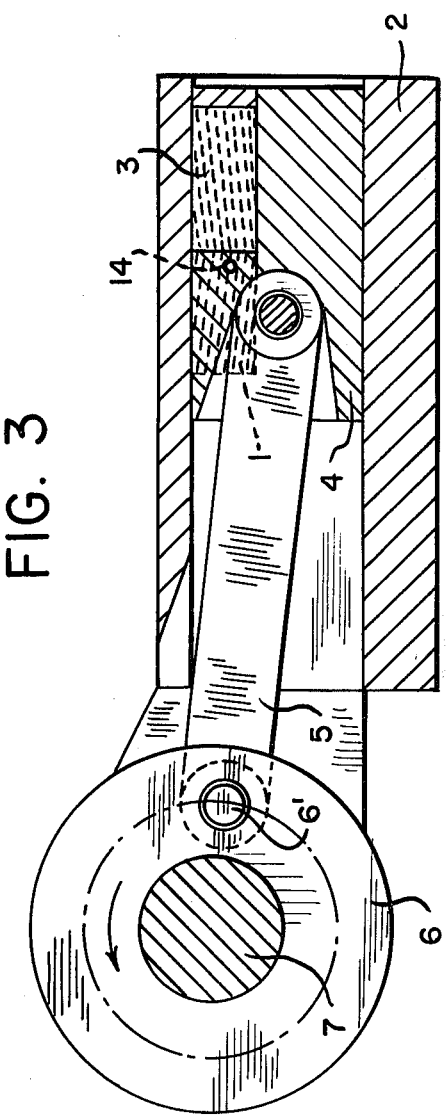
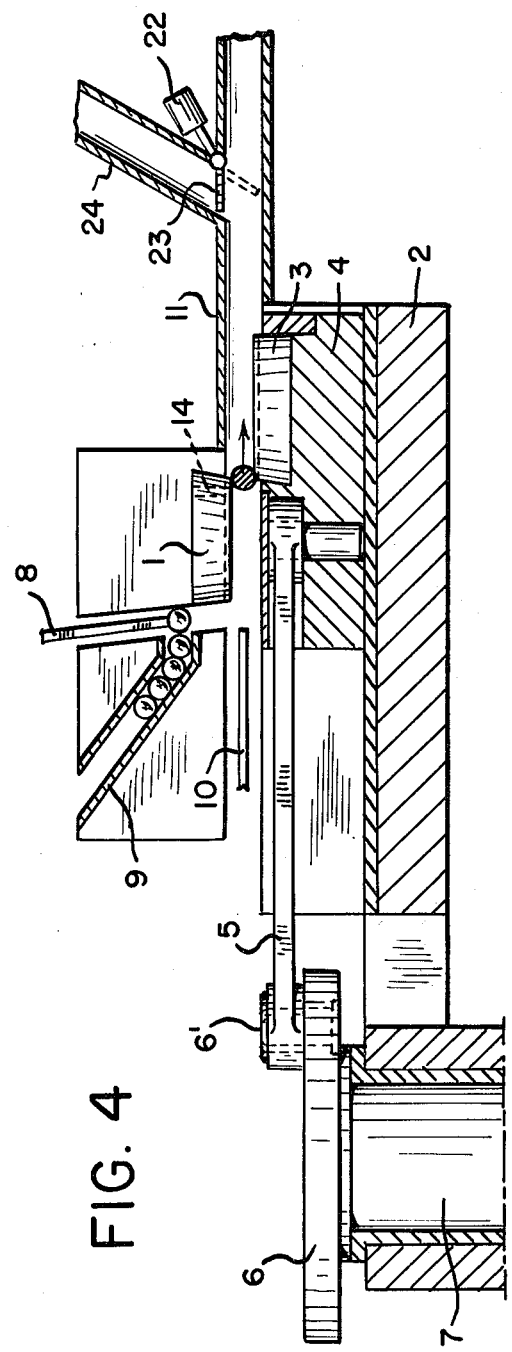

METHOD AND APPARATUS FOR DETECTING, SIGNALLING, AND SORTING INACCURATELY FORMED ARTICLES PRODUCED BY A TOOL MACHINE

BACKGROUND OF THE INVENTION

The present invention relates to a method and apparatus for detecting and sorting out articles improperly formed by a tool machine of the type having one relatively fixed machining element and a cooperating moveable machining element. Such machines include, among others, bolt trimming machines and thread forming machines as well as bolt forming machines which include both a trimming section and a thread forming section. In automatic bolt trimming machines and in bolt machines incorporating an automatic bolt trimming station, the blanks to be trimmed are periodically fed by suitable fingers to the bolt trimming station where a movable trimming die moves toward the holding die and during such movement engages the blank thus removing it from the fingers and inserting it in the holding die. During the last portion of the trimming die's movement toward the holding die the head of the bolt is shaped or cut to the desired shape, commonly hexagonal. At the end of the forward stroke the trimming die becomes relatively stationary and an ejection pin mounted within the holding die moves toward the trimming die to push the bolt into the channel within the trimming die to complete the cutting and shaping of the head and at the same time ejecting the same from the die. The ejection pin is operated by means of a lever and cam arrangement movement of which is integrated with the movement and, in particular, the completion of movement of the movable trimming die. At times, the trimming die becomes dull or pieces are broken out of the trimming die. When this occurs the ejection pin no longer has sufficient force to complete the trimming operation and eject the blank into the discharge channel within the trimming die. As a result the blank stays in the trimming die and upon the next stroke the blank hits the new product positioned in front of the holding die by the conveying fingers. As a result, various elements of the finger conveyor, the trimming die, or the holding die can be seriously damaged or destroyed.

One object of the present invention is to automatically detect blanks which have not been properly trimmed and ejected by monitoring the ejection pin which, under such circumstances, will not have made its full movement during the prescribed portion of the cycle. Upon detection of such an inaccurately trimmed product a portion of the machine, or all of the machine, is stopped automatically.

In automatic thread rolling machines, the blanks to be provided with thread are periodically fed to a pair of flat or cylindrical thread forming elements or dies, one of which is stationary and the other movable. The movable die is coupled to a rotating drive shaft which cyclically moves it past the stationary die to form a thread on the blank or work piece as it is rolled between the two dies. In such automatic thread rolling machines, the feeding of the blanks is coordinated with the movement of the movable die so that the blanks are inserted between the dies when the latter are at a predetermined position with respect to each other and the blanks are discharged at the end of the thread rolling cycle, after a predetermined movement of the movable die relative to the stationary die. Due to causes such as improper feeding of the blanks, the machine occasionally produces articles with a defective thread, for example, an overrolled thread or a thread with an improper geometry. Such defects in the thread on the finished articles are difficult to detect visually rendering the task of sorting the improperly thread rolled articles from correctly rolled ones, an expensive and time-consuming process since the finished products must be checked one by one.

One object of the present invention is to automatically detect articles rolled with a thread which does not meet the prescribed production requirements and to automatically separate those articles from ones with a correctly formed thread. Another object is to monitor the number of incorrectly formed articles and if the number exceeds a prescribed limit for a production run then to signal the operator, shut down the machine, or both.

SUMMARY OF THE INVENTION

The method and apparatus of the invention for detecting, sorting and signalling of improperly formed articles can be applied to various tool machines including, among others, trimming machines, thread rolling machines and bolt machines incorporating both of such machines. When the invention is applied to a bolt or blank trimming machine in which the head of a bolt is shaped by cooperation between a holding die and a trimming die with the final cutoff being accomplished by an ejection pin, the movement of the pin is monitored. A lever and cam arrangement moves the ejection pin the required amount at the appropriate time during normal operation of the device. A pulse generator is provided which is rotated by the same drive shaft as the cam and as such the number of pulses emitted by the generator are proportional to the amount of movement of the cam. Those pulses generated between the time when the ejection pin begins and when it completes its movements are counted. This count is then compared against a preselected lower and upper limit of pulses. If the pulses fall within the upper and lower limits predetermined, then in that event the machine continues to operate normally. However, if the pulses fall outside of the limits specified and set previously in thumb wheel switches then, in that event, a logic circuit emits a signal that stops the tool machine.

The method and apparatus of the invention for detecting and sorting of improperly thread rolled articles can be applied to various thread rolling machines of the type described above wherein one thread forming element or die is cyclically moved with respect to a second die by means of a rotating drive member or shaft. In accordance with the method of the invention, an improperly rolled article is detected by generating a series of pulses at a rate proportional to the angular rotation of the drive shaft so that the number of pulses produced during a given time interval corresponds to the angle through which the shaft rotates during that interval and, hence, is indicative of the movement of the movable die with respect to the stationary die during the same interval.

The number of pulses counted during a thread rolling cycle may be compared with a first and second number corresponding to the upper and lower limit of pulses, respectively, representing a predetermined maximum and minimum angle of rotation of the shaft required to produce a thread on the work piece of a predetermined accuracy which meets the prescribed production requirements. If the number of pulses counted during a thread rolling cycle falls between the two numbers, this indicates that the thread rolled on the article during that cycle is of acceptable quality. If, on the other hand, the number of pulses counted during a given thread rolling cycle is less than the first number or greater than the second number, this indicates that the drive shaft has rotated through an angle which is smaller or greater than that required to produce a thread of acceptable quality on the work piece. When this occurs, a signal indicative of an improperly formed thread on the article is generated and the signal is then used to sort the improperly rolled article from articles rolled with a correct thread.

The signals generated when the number of pulses counted during a thread rolling cycle falls outside of the predetermined limits may be counted and compared with a number corresponding to the maximum number of improperly rolled articles that is acceptable for a given production run or time interval. If the number of improperly rolled articles exceeds the maximum permissible number, a signal indicative of this fact is generated and this is used to actuate a visual or audible alarm which warns the operator that the thread rolling machine is malfunctioning and requires attention.

The apparatus of the invention for carrying out the above method comprises means, such as a pulse generator, coupled to the shaft driving the movable die for generating a series of pulses at a rate proportional to the angular rotation of the shaft. The apparatus further includes a counter for counting the number of pulses emitted by the pulse generator and means such as a pair of switches for producing a first and second signal at the start and end of the thread rolling cycle, respectively. The switch for generating the first signal, i.e. the start signal, may for example be attached to the frame of the thread rolling machine and actuated by an actuating member attached to the movable die when the two dies are at a predetermined position corresponding to the start of the thread rolling cycle at which the blank should be inserted between the dies. The second switch may also be mounted on the frame of the machine and actuated by a movable actuating member when the latter is engaged by the finished article as it is discharged from the dies at the end of the thread rolling cycle.

The counter is connected to the two switches and is arranged to count the number of pulses generated by the pulse generator during the interval between the first and second signals. As discussed earlier, the number of pulses counted during the interval corresponds to the angular rotation of the drive shaft and, hence, the excursion of the movable die during that thread rolling cycle. This number is then compared by a comparator with a first and second number corresponding to the lower and upper limit of pulses, respectively, which should be received during one cycle. If the number of pulses counted during a thread rolling cycle is less than the first number or greater than the second number, the comparator generates a signal indicative of an improperly thread rolled article.

The signal so generated by the comparator may be used for any number of purposes but, preferably, it is used to activate a switch which in turn moves a gate in the discharge chute thus guiding the improperly formed product into a rejection chute and bin. The signal may also be used to provide a statistical control by feeding the same to a suitable statistical control circuit where all improperly formed articles are counted by the signals produced and when the number of improperly formed articles exceeds a prescribed limit for a given production run, then in that event, another sigal is emitted to signal the operator and/or shut down the machine.

BRIEF DESCRIPTION OF THE DRAWINGS

FIG. 3 is a view similar to FIG. 1 showing the machine at the end of the thread rolling process;

FIG. 4 is a view similar to FIG. 2 but showing the machine at the end of the thread rolling process as in FIG. 3;

DETAILED DESCRIPTION OF THE PREFERRED EMBODIMENTS

Figure 1:
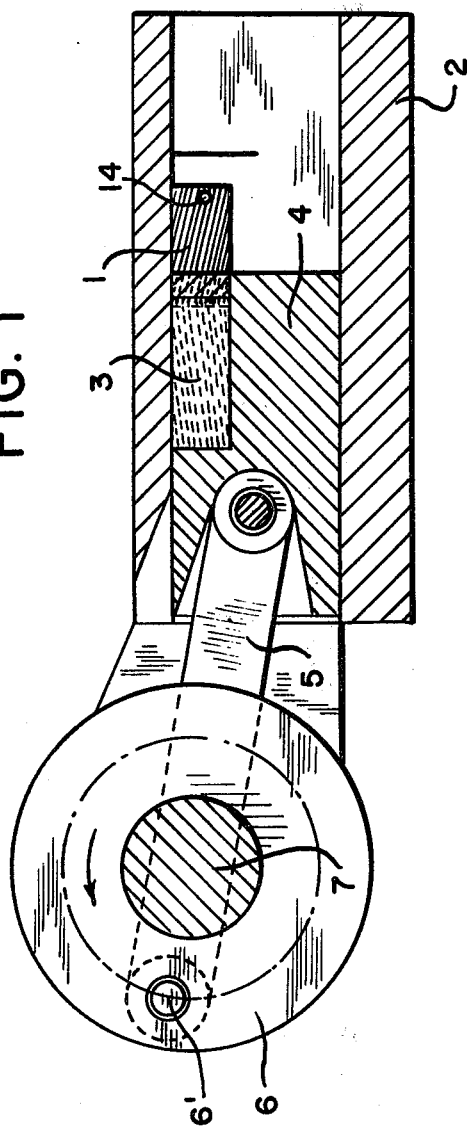
FIG. 1 is a somewhat schematic partially side elevation and partially vertical section of a portion of a thread rolling machine at the beginning of the thread rolling process.
Figure 2:
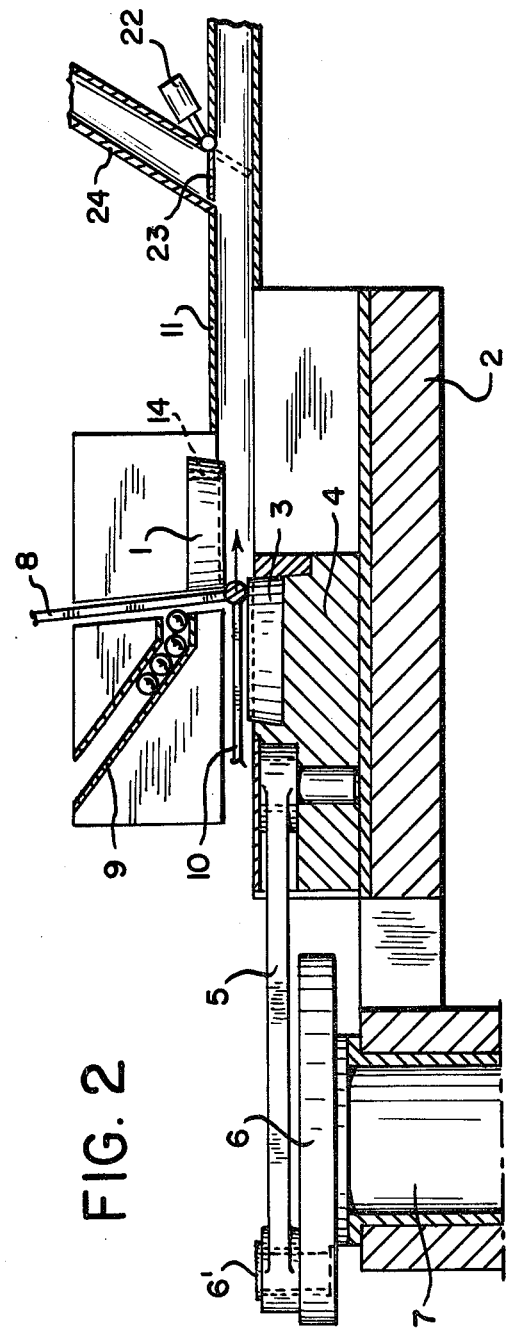
FIG. 2 is a somewhat schematic top plan view partly in horizontal cross-section of the machine of FIG. 1.

FIGS. 1 to 4 show a thread rolling machine of the type in which the thread is formed by rolling the work piece or blank between a pair of thread forming tools or dies which move with respect to each other. Referring to FIGS. 1 and 2, the machine includes a frame 2 to which is affixed a flat thread rolling die 1. die 1 cooperates with a second movable thread rolling die 3 attached to a sledge 4 mounted for reciprocal movement in frame 2. The sledge 4 is reciprocated left to right, as viewed in FIGS. 1 and 2, by a drive bar 5 pivoted about pin 6' on fly wheel 6 which is attached to a rotationally driven shaft 7.

As shown in FIG. 2, the blanks are stored in a supply chute 9 from which they are fed to the thread rolling machine by an input finger 8. At the start of the working stroke of the sledge 4, at the position thereof shown in FIG. 2, the input finger 8 presses the blank against the thread rolling die 3 while a second finger 10 pushes the blank into the space between dies 3 and 1. As the fly wheel 6 rotates, the sledge 4 is pushed to the right, as viewed in FIG. 2, by the drive bar 5, so that the blank is gripped between the thread rolling dies 3 and 1 and is rolled between the two dies by the movement of die 3 attached to the sledge. When the sledge 4 arrives at the position shown in FIGS. 3 and 4 at the end of its working stroke, the work piece now provided with screw thread is discharged from the machine through chute 11.

Figure 5:
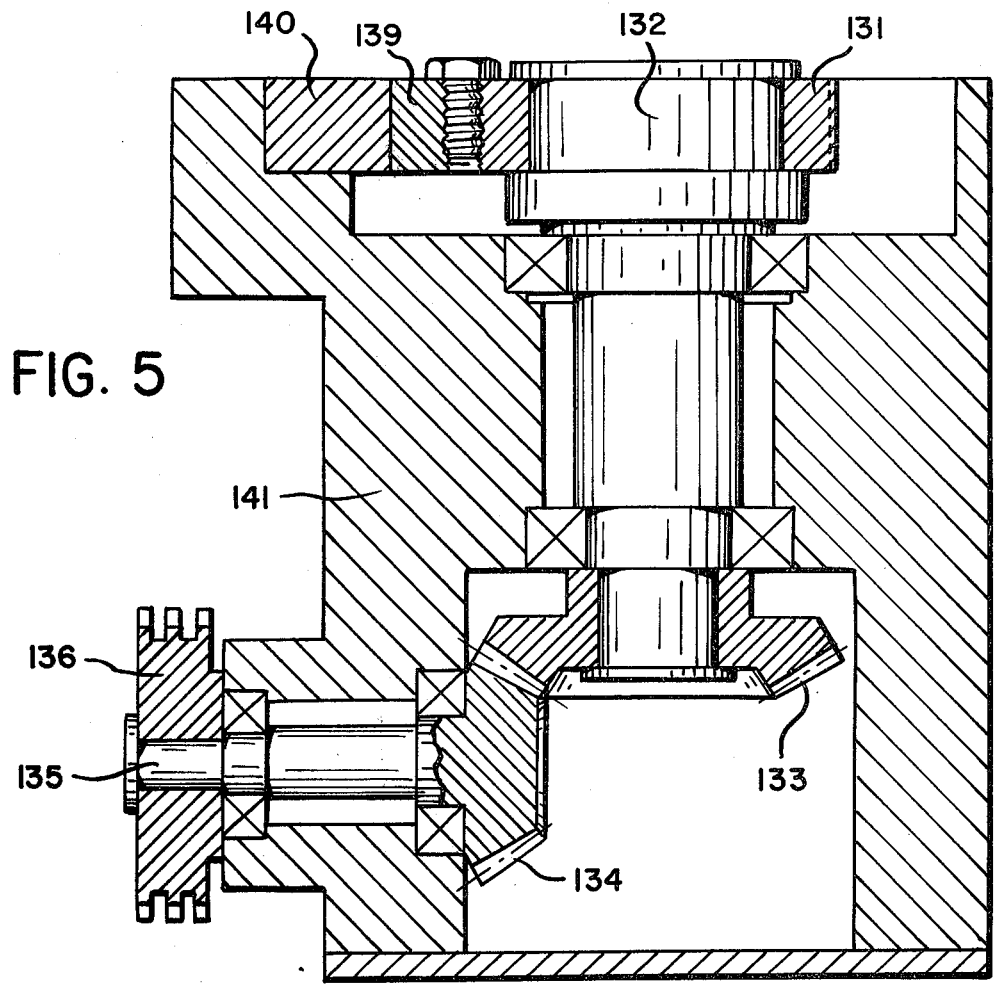
FIG. 5 is a somewhat schematic vertical cross-section of a thread rolling machine of a different type.
Figure 6:
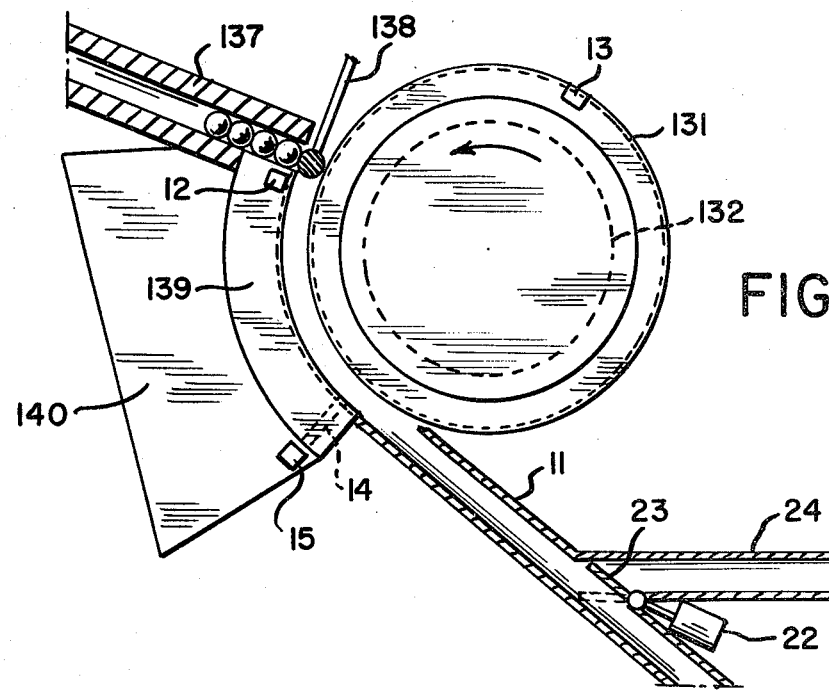
FIG. 6 is a somewhat schematic top plan view of the machine in FIG. 5.
Figure 7:
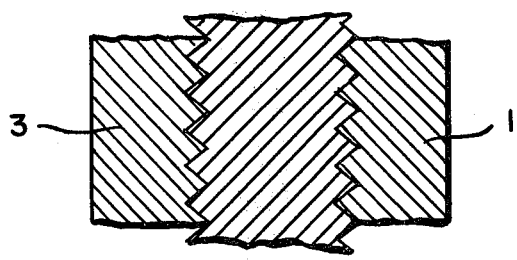
FIG. 7 is an enlarged cross-section through the dies as they form threads on a bolt.

FIGS. 5 and 6 schematically show another type of thread rolling machine in which the thread on the blank is formed by a pair of cylindrical thread forming tools. As shown in the figures, the thread forming die 131 is attached to a vertical shaft 132 which is mounted for rotation in frame 141. Attached to the lower end of the vertical shaft 132 is a conical gear 133 which meshes with a second conical gear 134 on a horizontal shaft 135. The horizontal shaft is driven by pulley 136 and in turn rotates the vertical shaft 132 by means of the conical gears 133 and 134. The thread forming die 131 cooperates with a mating arcuate thread rolling die 139 attached to a support member 140 which is adjustably mounted on the frame 141.

As shown in FIG. 6, the blanks are fed to the thread rolling machine by gravity from a supply chute 137. A finger 138 presses the blank emerging from the chute 137 between the thread forming die 131 and stationary thread forming die 139. The thread is formed in the blank as it passes between the rotating die 131 and the stationary die 139 upon rotation of shaft 132 and the finished product is discharged from the machine via chute 11.

Figure 8:
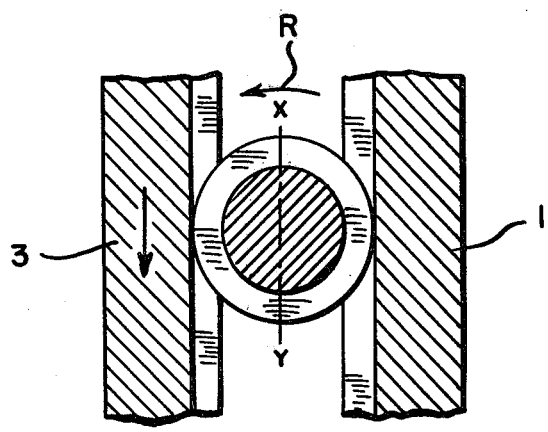
FIG. 8 is a horizontal cross-section of the dies forming threads on a bolt as in FIG. 7.

During the thread rolling operation either in a machine having flat thread rolling dies of the type shown in FIGS. 1 to 4 or one having cylindrical thread forming dies such as that shown in FIGS. 5 and 6, the blank makes two movements as it passes between the thread rolling dies. That is, the blank rotates about its longitudinal axis and advances along the space between the thread forming dies. As the blank engaged between the thread rolling dies rotates about its axis half a revolution, one half of the screw thread is forming on its periphery by one of the dies, for example by the moving die 3 or die 131, and the other half of the thread is formed by the second dies such as the fixed die 1 or 139. As can be seen in FIG. 8, the moving die 3, thus forms the portion of the thread extending from Y to Z in the direction of the arrow R and the fixed rolling die 1 forms the portion extending from X to Y, also as viewed in the direction of the arrow R. As the blank rotates through the other half of a revolution, the screw thread portion formed by die 3 during the first half of the revolution comes into contact with die 1 and the thread portion formed by die 1 comes into contact with die 3. For the thread to be formed properly, both the rotation and the advancement of the blank should start at the moment that the driving shaft or crank shaft of the machine is in a predetermined position. Furthermore, both the rotation and the advancement of the blank should end at the moment when the driving shaft or crank shaft has rotated through a predetermined number of degrees.

It often occurs, however, that the rotational and advancing movements of the blank do not start at the correct moment because of slip. This occurs, for example, when the blank is pressed between the dies before the movable die starts to move so that the advancing movement of the blank starts before its rotational movement. Slip also occurs if the movable die starts to move before the blank is inserted between the rolling dies and starts to rotate about its axis.

Figure 9:
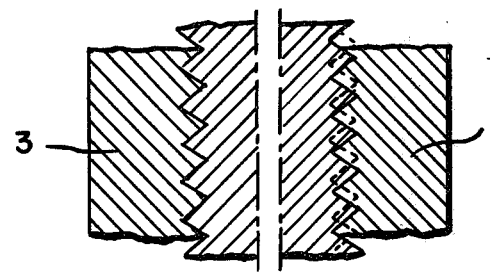
FIG. 9 is a view similar to FIG. 7 showing an improperly formed thread in a bolt.

In both these cases, because of slippage, the screw thread formed in the blank during the first half of its revolution by the moving die 3 is not received properly in the thread profile of the fixed die 1 during the other half of the revolution. The fixed die 1 then deforms the screw thread formed during the first half revolution by die 3, as shown in FIG. 9, producing the so-called two-way screw thread, or "drunken screw thread" in which the thread on one half of the blank periphery is axially displaced with respect to that on the other half. As a result, the thread profile formed during the first half revolution is overrolled during the other half revolution, so that an overrolled thread profile is produced.

Another cause of improper thread rolling is irregular insertion or pressing of the blank between the rolling dies. Such an irregularity can occur, for example, when the blank is inserted in an inclined position between the rolling dies. This will also produce slip since the rotation about the axis of the blank is delayed with respect to the movement of the movable die such as the rolling die 3 or the thread forming die 131. As a result of slipping due to the improper insertion of the blank between the thread rolling dies, a deviation of pitch occurs resulting in improper geometry of the screw thread profile producing a so-called "swinging" screw thread.

The apparatus and method for detecting and sorting of improperly thread rolled articles will now be described with reference to FIGS. 10 to 14. As mentioned earlier, the thread is formed on the blank as it rotates about its axis and advances between the thread forming dies, the rotational and translational motion being imparted to the blank by movement of one of the dies with respect to the other. As also mentioned earlier, in order to avoid defects, such as overrolled threads or "swinging" threads, the rotational and advancing or translational movements of the blank should take place during a predetermined part of each revolution of the shaft imparting movement to the movable thread forming die.

Figure 10:
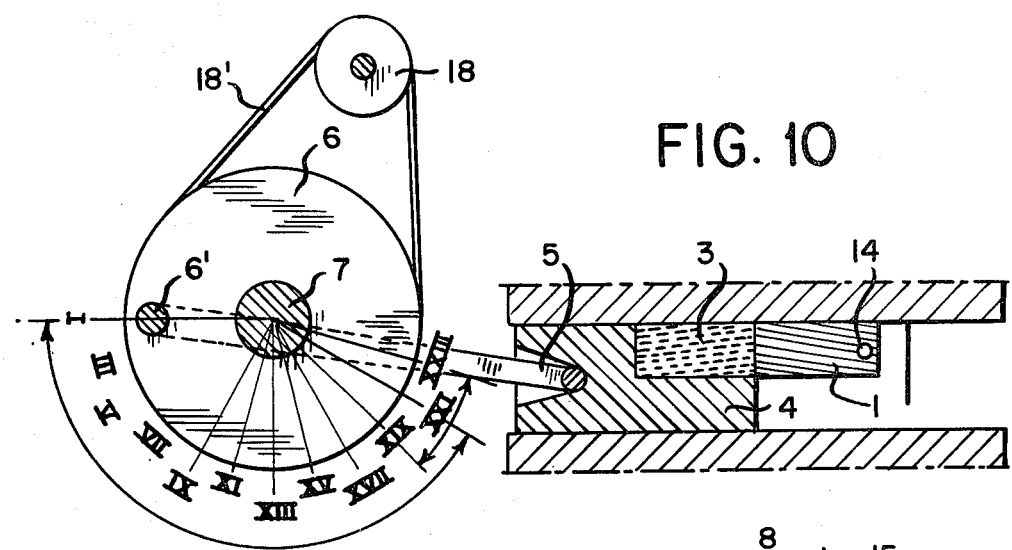
FIG. 10 is a somewhat schematic showing of the thread rolling machine as shown in FIG. 1 with the pulse generator also shown.
Figure 11:
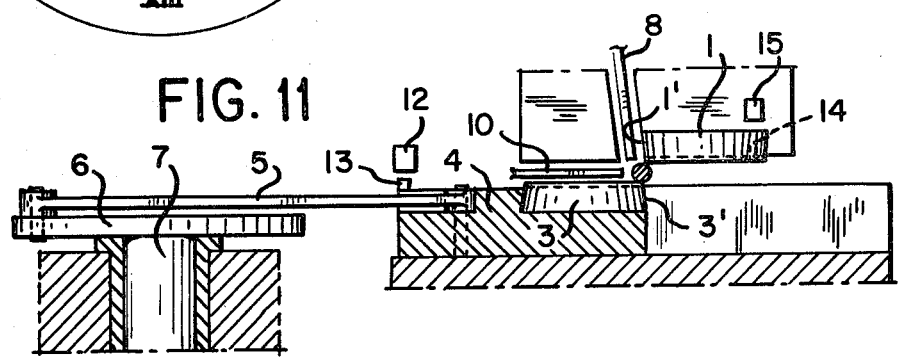
FIG. 11 is a generally horizontal sectional view of the apparatus as shown in FIG. 10.
Figure 12:
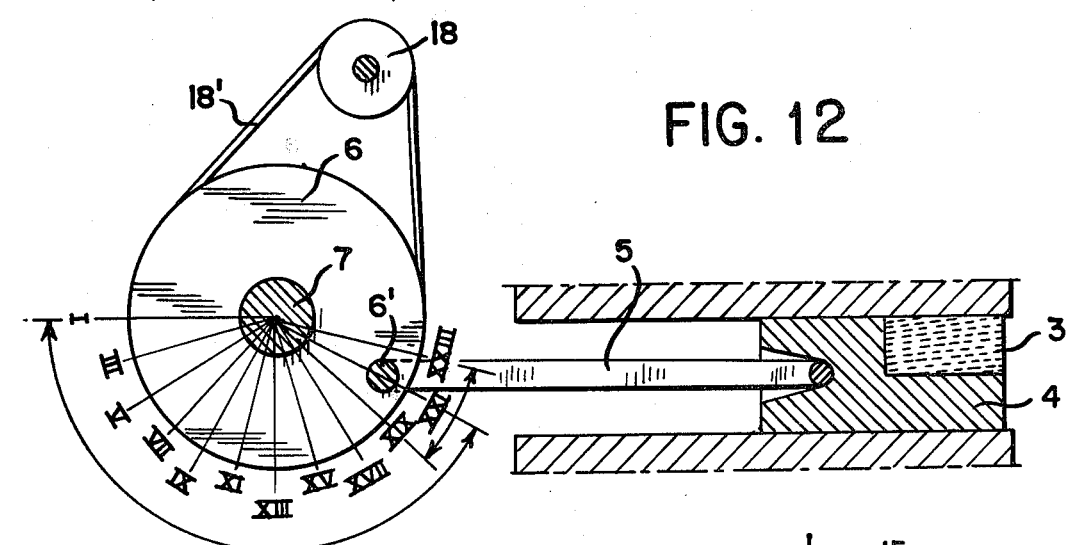
FIG. 12 is a view similar to FIG. 10 with the parts of the device shown at the end of a thread rolling cycle.
Figure 13:
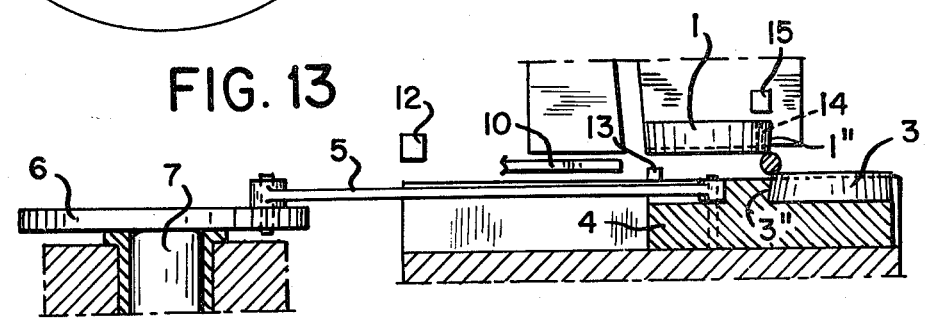
FIG. 13 is a view similar to FIG. 11 with the parts shown at the end of a thread rolling cycle.

To obtain a perfect thread, the thread rolling cycle should start when the crank shaft 7 is in the position shown in FIGS. 10 and 11. In this position of the crank shaft 7, the radial line identified by I in FIG. 10 passes through the center of the crank pin 6' and it will be referred to as position I of the crank shaft. As shown in FIG. 11, at position I of the crank shaft and bar 5, the leading edge 3' of the thread forming surface on block 3 is aligned with the forward edge 1' of the thread forming surface on the fixed die 1. The thread rolling cycle should end when the crank shaft rotates through an angle $\theta$ into the position, shown in FIG. 12, at which the crank pin 6' is aligned with a radial line identified by XXI in the figure. In this position of the crank shaft, which will be referred to as position XXI, the trailing edge 3" of die 3 is aligned with rearward edge 1" of die 1. Thus, for proper operation of the machine, the blank should be inserted between the rolling dies 1 and 3 at position 1 of the shaft and the finished article should be discharged from the rolling dies when the shaft rotates into position XXI.

In accordance with the invention, the movement of the blank during the thread rolling operation is monitored electronically. This is accomplished by emitting a series of pulses derived from the movement of the crank shaft at a rate proportional to the angular rotation of the shaft so that the number of pulses emitted during a given thread rolling cycle is proportional to the number of degrees through which the shaft rotates during that cycle. The pulses are received by an electronic apparatus which counts the pulses and compares the number of received pulses with a predetermined number equal to the number of pulses which correspond to the number of degrees that the shaft should rotate in a single cycle to produce a perfectly rolled article.

Figure 14:
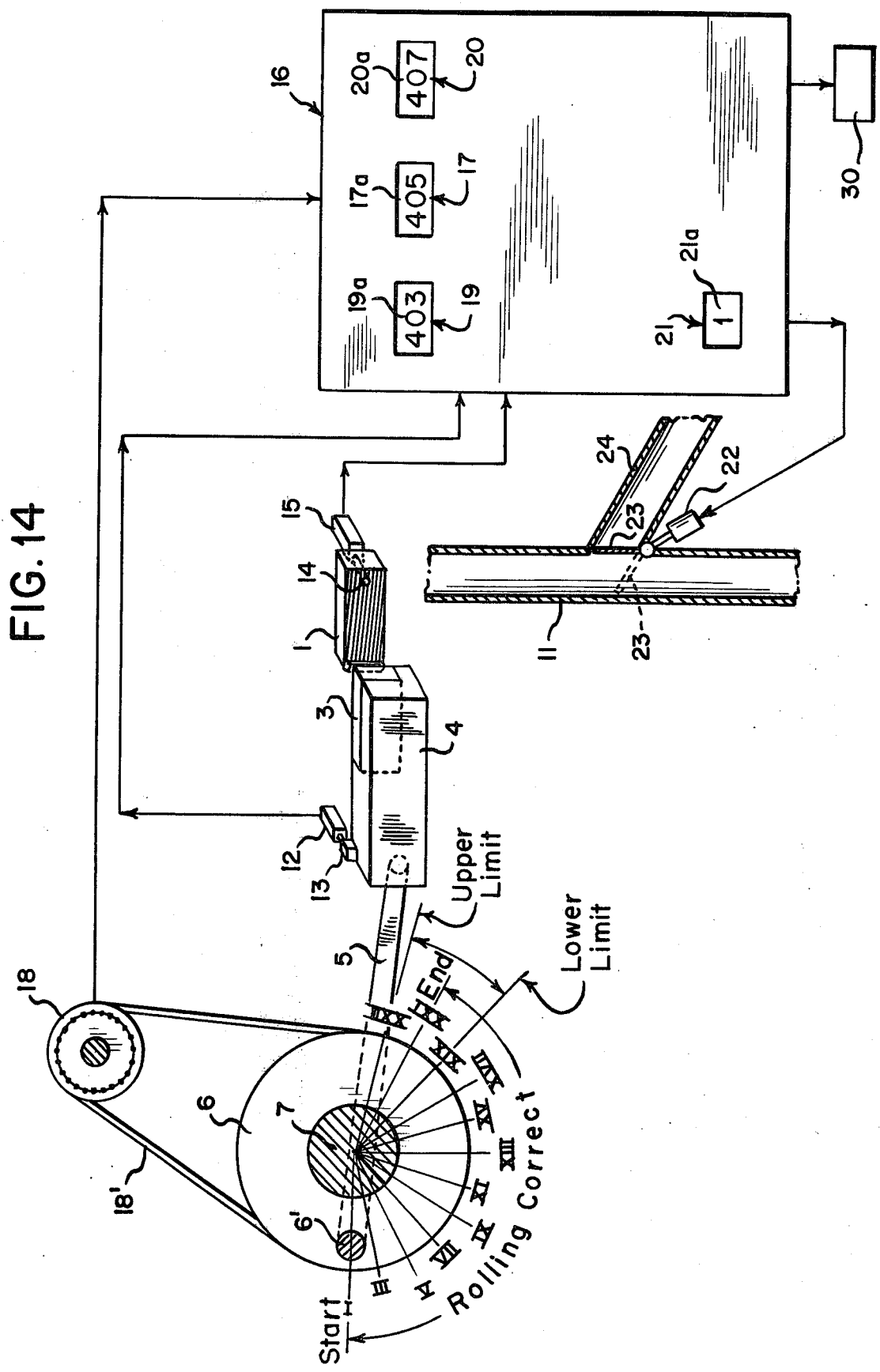
FIG. 14 is a schematic showing of the thread rolling machine with the pulse generator and the general circuits involved in the invention.

As shown in FIG. 14, the pulses for monitoring the rotation of the shaft are produced by a pulse generator 18 which is driven by the crank shaft via V-belt 18'. Alternatively the fly wheel 6 may be used to drive the pulse generator or the generator can be attached directly to and be driven by the shaft 7. The pulse generator is arranged to emit a pulse each time that the shaft rotates through a predetermined angle, which may be a fraction of a degree. The number of pulses emitted by the pulse generator during a given time interval is thus proportional to the number of degrees that the shaft rotates during that interval.

Figure 21:
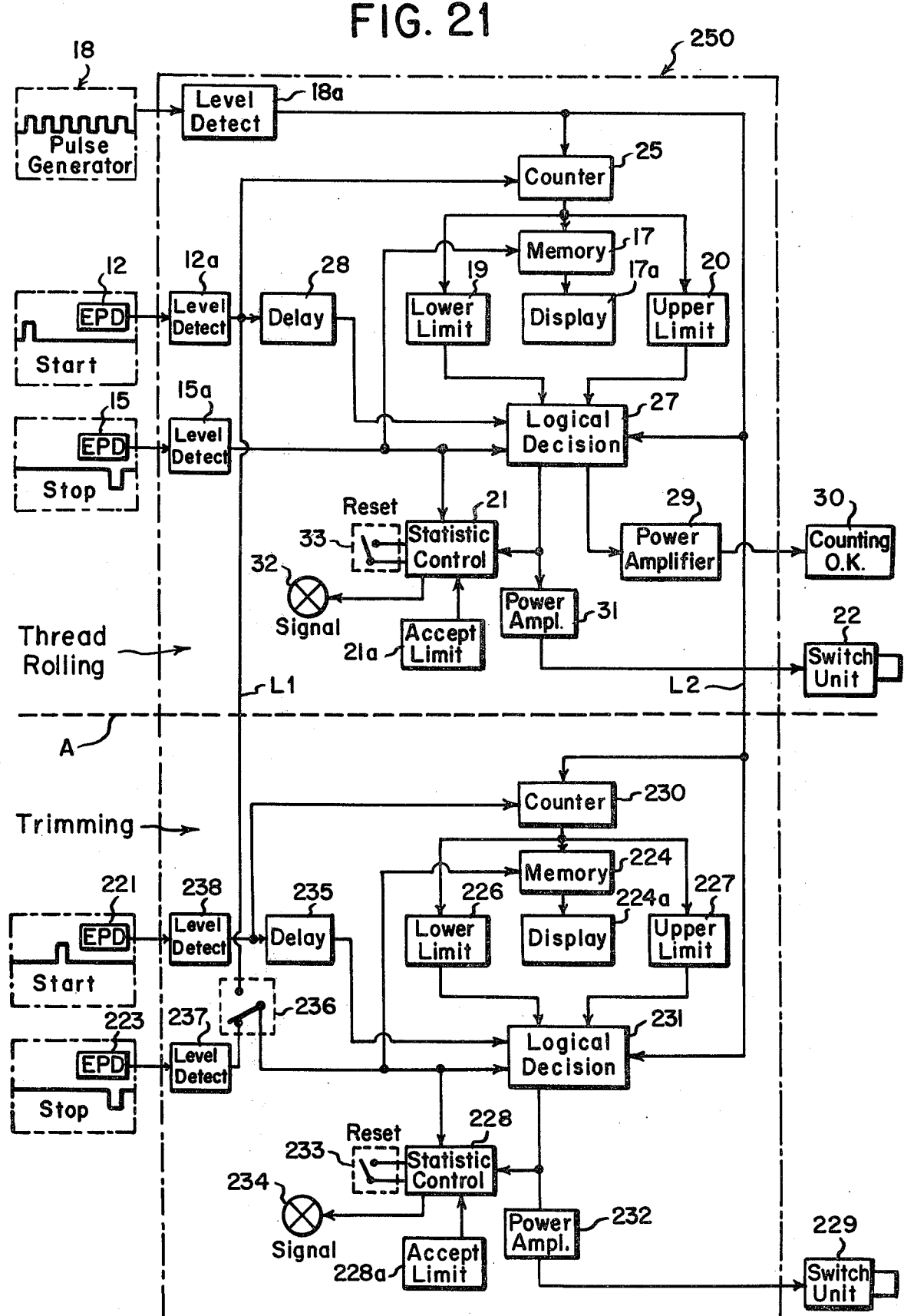
FIG. 21 is a more detailed block diagram showing how the invention is applied to a trimming machine and a thread rolling machine when such machines are incorporated in one overall bolt making machine.

The pulses emitted by the pulse generator 18 are transmitted to an electronic apparatus generally indicated at 16 in FIG. 14. As shown in FIG. 21, the pulse generator is connected to a level detector 18a which serves an adapting function between the sensor of the pulse generator 18 and the detection electronics. The number of pulses is then fed to a binary coded decimal (BCD) counter 25 which receives and counts the pulses emitted from the start of forward movement of the sledge 4 to the stopping of the forward movement of the sledge 4. The counter 25 is reset automatically after the end of each cycle. The counter 25 is connected to an electrical proximity device (EPD) which serves as a start switch 12 and to an EPD which serves as a stop switch 15. The start switch 12 and stop switch 15 provide the start and stop signal for initiating and terminating the counting sequence. Level detector 12a and 15a serve an adapting function between the start switch 12 and the stop switch 15, respectively, and the detection electronics. The start switch 12 is mounted on the frame of the machine and is activated by member 13 attached to the sledge 4. The actuating member 13 and switch 12 are positioned such that the former actuates the EPD switch 12 when the crank shaft 7 is in position I, shown in FIGS. 10, 11 and 14 corresponding to the start of the thread rolling cycle. The EPD stop switch 15 is actuated by a pin 14 shiftable into and out of the fixed rolling die 1. The position of the pin 14 and switch 15 are such that at the end of the thread rolling cycle when the shaft is in position XXI shown in FIGS. 12 and 13, the pin is pushed back by the finished article as the latter passes past die 1 thereby actuating the EPD stop switch 15.

The number of pulses counted by counter 25 during the interval between the start and stop signals provided by switches 12 and 15 are compared with predetermined numbers set in a level logic latch memory 17 in which is stored the correct number of pulses which should be received during one cycle if the product is correctly formed. The number set into memory 17 is displayed in window display 17a. For example, the pulse rate of the generator 18 may be set such that 405 pulses are emitted as the shaft 7 rotates from position I at the start of the thread rolling cycle into position XXI at the end of the cycle. The memory 17 is then set to the number 405 and this number is written into a memory.

The number of pulses counted by counter 25 is compared with the number set in two adjustable thumbwheel switches 19 and 20. Thumbwheel switch 19 is used to set a number equal to the lower limit for the number of pulses which may be received for the rolled article to be still acceptable. The number preselected for switch 19 as the lower limit is displayed in window display 19a. The number set in switch 19 corresponds to the minimum angle through which the shaft 7 can rotate during a given cycle and still produce an article with an acceptable thread. This situation occurs, for example, when the thread rolling cycle starts after the crank pin 6' has passed position I or when the cycle ends before the crank pin reaches position XXI. The thumbwheel switch 20 is set to a number equal to the upper limit for the number of pulses which may be received during one thread rolling cycle and such number is displayed in display window 20a. The number to which switch 20 is set corresponds to the maximum angle that the shaft can rotate and still produce an acceptable thread on the work piece. This situation occurs, for example, when the thread rolling cycle ends after the center line of the crank pin 6' has passed position XXI. The comparison of the number of pulses counted by the counter 25 during the cycle with the lower and upper limits set in switches 19 and 20, respectively, is accomplished by means of a logic circuit 27 connected as shown in FIG. 21 to the pulse generator 18, memory 17, lower limit switch 19, upper limit switch 20, stop switch 15, and a delay circuit 28. As will be apparent the delay circuit 28 causes a delay in the various circuits as required. If the comparison of the number of pulses received from the pulse generator 18 indicates that the same falls within the limits set by the upper and lower limit switches 20 and 19, respectively, then, in that event, the logic circuit 27 provides a signal to the counter 30 through power amplifier 29. The counter 30 counts the number of correctly manufactured products produced. If, on the other hand, the number of pulses generated by the pulse generator 18 and counted by the counter 25 are found by the logic circuit 27 to fall outside the limits set in the upper and lower limit switches 20 and 19, respectively, then, in that event, the logic circuit 27 provides a signal through power amplifier 31 to switching unit 22. Switching unit 22 may, for example, be an electro-magnet.

The sorting of the improperly produced articles (see FIGS. 2, 4, and 14) is effected by the provision of an auxiliary chute 24 connected to the main discharge chute 11 of the thread rolling machine and a gate 23 in the wall of the chute 11. The gate is controlled by an electro-magnet 22 and is pivotable between two positions such that in one position the main chute 11 is opened for discharge of correctly fabricated articles and in the second position chute 11 is closed and auxiliary chute 24 is opened for separately discharging the improperly fabricated articles. When the number of pulses received by the electronic apparatus 16 during a given thread rolling cycle falls outside the range set in limit switches 19 and 20, a signal is sent to the electro-magnet 22. In response to the signal, the magnet moves the gate 23 from its normal first position shown in solid lines in FIGS. 2, 4 and 14 into the position indicated by dotted lines, closing the main discharge chute 11 and opening the auxiliary chute 24. Thus when the improperly rolled article is discharged from the thread rolling machine, it is directed by gate 23 into the auxiliary chute 24. Preferably, the power amplifier 29 maintains the signal to the electro-magnet 22 for a time sufficient for the improperly rolled article to pass by the gate 23 and into the chute 24. The signal is then terminated which thus permits the gate to move back to its normal position under the urging of a spring in the electro magnet. This effects the opening of the main chute 11 and closing of auxiliary chute 24.

The electronic apparatus 16 also includes a thumbwheel switch 21 which is used to set the maximum number of improperly rolled articles that is acceptable for a given production run. The number set is displayed in window display 21a. This number may, for example, correspond to the maximum number of improperly rolled articles that can be expected in normal production run with a properly operating thread rolling machine. The number set by means of device 21 is compared to the number of signals received from the logic circuit 27 that are indicative of an improperly rolled article. If the number of improperly rolled articles exceeds the number preset in device 21, a signal 32 is emitted by the statistical control 21 activating a visual or audible alarm device which warns the operator that the thread rolling machine is malfunctioning. For example, the excessive number of improperly rolled articles produced by the machine may be due to excessive wear of the rolling tools, misalignment of the rolling tools or some other condition requiring corrective action by the operator. The apparatus may also be adjusted to emit a warning signal each time that an improperly rolled article is produced or the signal can be used to automatically stop the thread rolling machine. A reset mechanism 33 is provided for statistical control 21.

To use the apparatus of the invention, the predetermined number of pulses which should be received upon rotation of the shaft through an angle required to form a thread on the article satisfying the prescribed requirements is set in presettable memory device 17. In the example of the embodiment according to FIG. 14 this number of pulses is 405. Similarly the lower and upper limit for the number of pulses corresponding to the minimum and maximum angle that the shaft can rotate and still produce a thread of acceptable quality is set by means of thumbwheel switches 19 and 20, respectively. The lower and upper limits are dependent on the quality of the thread requirement for a given production run and in the embodiment of FIG. 14 are shown in 403 and 407, respectively. It will be understood that the closer the lower and upper limits are to the number set in the memory device 17, the better the average quality of the rolled articles that will be produced. Finally, the maximum, permissible number of improperly thread rolled articles for a given run is set by means of thumbwheel switch 21. This number thus corresponds to the permissible number of articles for which the received number of pulses will be lower or higher than the present lower or upper limit, respectively.

When the invention is used in connection with a thread forming tool of the rotary type such as shown in FIGS. 5 and 6 the EPD start switch 12 may be located as shown in FIG. 6 to respond to the passage of the element 13 as in the embodiment of FIGS. 1–4 and 7–14. As shown in FIG. 6 the element 13 may be mounted on the movable die 131 at the appropriate spot at the beginning of the thread forming portion of the die 131. Similarly, the pin 14 may be mounted in the fixed die 139 as shown in FIG. 6 to move with respect to the EPD pick-up for the stop switch 15 as in the previous embodiment. The members 11, 22, 23, and 24 in FIG. 6 as well as the start and stop switch elements 12–15 are the same as those elements having the same reference numerals in the previously discussed embodiment and as shown in the other figures.

TRIMMING MACHINE EMBODIMENT

FIGS. 15–20 show the manner of applying the invention to a machine tool of the trimming tool type. The trimming machine comprises a trimming die 201 mounted by means of a spacing sleeve 202 in a holder 203 which is in turn mounted in the member 204 secured to the main reciprocating slide 205. The main slide 205 reciprocates within a bearing 205' fixed in the machine. A connecting rod 206 is pivoted at 206' at one end to the main slide 205. The connecting rod 206 is journalled at its other end on the crank of a crank shaft 207 whereby upon rotation of the crank shaft 207 the main slide is reciprocated to the left and right as viewed in FIGS. 15–20.

Figure 17:
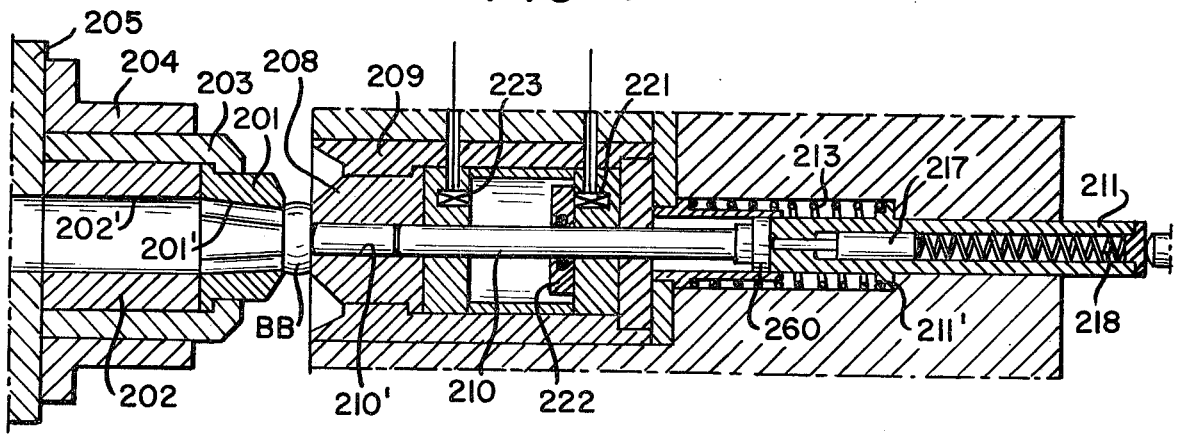
FIG. 17 is an enlarged vertical cross-sectional view of the dies shown at the moment the trimming die starts the cutting on the head of a bolt.

A holding die 208 is mounted by means of a holder 209 in the frame of the machine. An ejection pin 210 is mounted to reciprocate within the holder 209 and in the bore 210' extending through the holding die 208. A push rod 211 mounted in the frame of the machine for reciprocating movement with respect thereto is in alignment with the ejection pin 210 whereby reciprocating movement of the rod 211 is transmitted to the ejection pin 210. Reciprocating movement is imparted to the push rod 211 by means of a bell crank lever 212 mounted for pivoting movement upon a shaft 214. Movement of the bell crank 212 is effected by means of a cam 215 against which a roller 215' on the bell crank lever 212 bears. The cam 215 is secured on a shaft 216 which is rotated by means of a drive mechanism, not shown, which connects the crank shaft 207 to the cam shaft 216. Accordingly, rotational movement of the crank shaft 207 is imparted to the cam shaft 216 at a fixed rate and said shaft 216 will be rotated in proportional timed relationship with crank shaft 207. A compression spring 213 mounted within the frame of the machine bears at one end against a fixed portion of the frame and at the other end against a flange 211' on the push rod 211. The spring 213 at all times urges the rod 211 toward the right thus maintaining it in contact with the bell crank 212 and in turn maintaining contact between the roller 215' and the cam 215. In effect, the cam 215 provides the motion to the push rod 211 in the direction toward the left in the figures and the spring 213 serves as a return mechanism toward the right. At its end adjacent to the ejection pin 210 the push rod 211 bears against a flange 260 so that movement of the push rod 211 under the urging of the bell crank 212 toward the left will also be imparted to the ejection pin 210. Within a bore in the push rod 211 is a compression spring 218 and an ejection rod 217 one end of which bears against the flange 260 and the other end of which bears against the spring 218 all of which is as shown in FIGS. 17-19.

A set of conveying fingers, not shown, brings a bolt blank BB to a position in alignment with the bore 210' in the holding die 208 at a time when the trimming die 201 has been moved to its extreme left position (not shown) by the crank shaft 7 thus providing a space between the trimming die 201 and the holding die 208. The fingers are timed to hold the bolt blank BB in this position until movement of the trimming die 201 toward the right has brought it into contact with the bolt blank BB and begun the insertion of the stem of the bolt blank BB into the bore 210' of the holding die 208. The trimming die 201 continues its movement toward the right under the movement imparted thereto by the slide 205 and the crank shaft 207 continuing the insertion of the stem of the bolt blank BB into the bore 210' of the holding die 208; however, before this movement is complete the conveying fingers release the bolt since the same is at that point sufficiently held by the holding die 208 and the trimming die 201. Continued movement toward the right of the trimming die 201 brings the parts into the position shown in FIG. 17. In the position shown in FIG. 17 the bolt blank BB has just been completely inserted into the holding die 208, the trimming die 201 bears against the head of the blank and the trimming and shaping of the head is just about to commence.

Figure 18:
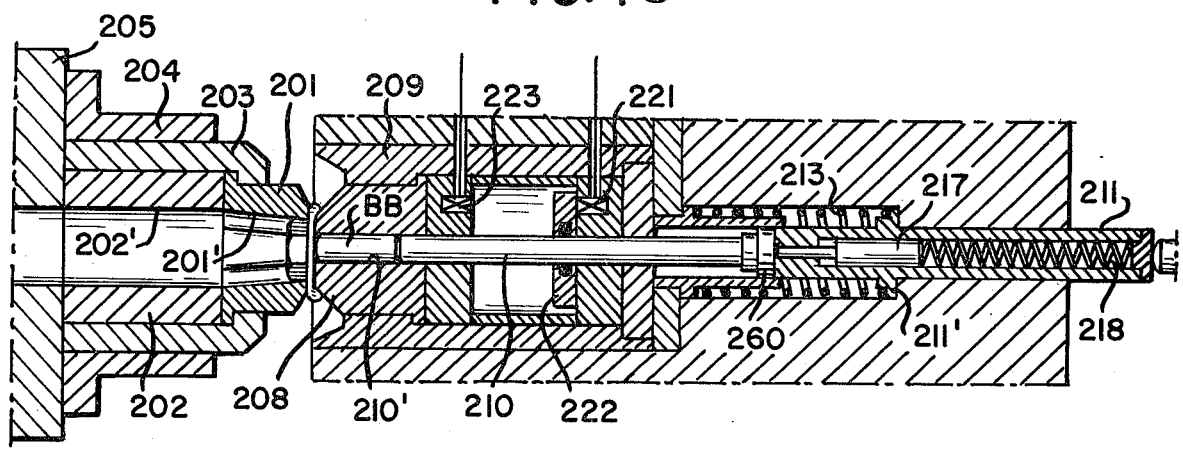
FIG. 18 corresponds to FIG. 17 showing the parts at the end of the cutting movement of the trimming die with the trimming die at its extreme forward position and with the ejection pin at the beginning of its movement toward the trimming die at the beginning of the second and final portion of the trimming operation.
Figure 19:
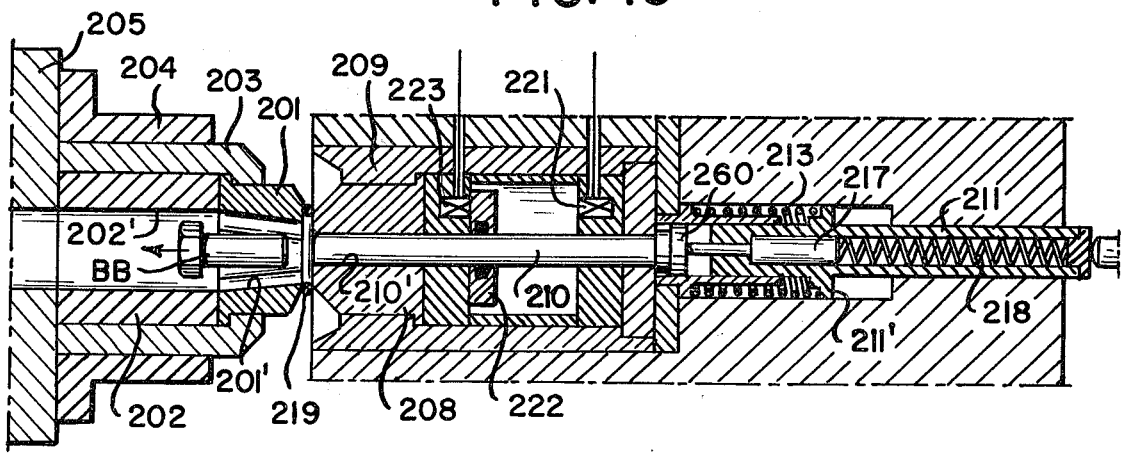
FIG. 19 corresponds to FIG. 18 but showing the ejection pin at its most extreme position at the end of the final trimming operation.

Further movement toward the right of the trimming die 201 cuts the desired shape for the bolt head on the blank BB as shown in FIG. 18. As shown in FIG. 18 the bolt is being provided with a hexagonal head shape and the trimming is nearly completed. Also, in the position shown in FIG. 18 the main slide 205 and accordingly the trimming die 201 has reached the extreme limit of its rightward movement. The remaining portion of the head is trimmed by virtue of the pressure applied to the stem of the bolt by the ejection pin 210 which, under the force applied thereto by the push rod 211 pushes upon the stem thus completing the cutting of the shape of the bolt head. During this movement of the ejection rod 210 toward the left under the pressure applied thereto by the push rod 211, the ejection rod 217 effects compression of the spring 218 as shown in FIGS. 17 and 18. Then, just as the ejection pin 210 reaches the left hand limit of its movement under the pressure applied thereto by the push rod 211 or even slightly before reaching such leftward limit the compression spring 218 will expand moving the ejection rod 217 toward the left and causing a final accelerated movement of the ejection pin 210 toward the left thus separating the flange 260 on the ejection rod 210 from the left hand end of the push rod 211 and accelerating the bolt blank so that it passes through the bore 202' which extends through the spacer sleeve 202 is alignment with a tapered bore 201' within the trimming die 201. Under the accelerated force imparted thereto by the ejection pin 210 and in particular by the force of the ejection rod 217 and compression spring 218 as they act upon the ejection pin 210 the bolt blank BB will be forced through the bores 201', 202' and through a curved bore 203' in the slide 205 and from thence through a bore 204' in the frame of the machine for collection in a suitable bin, not shown.

It sometimes occurs that the trimming operation does not take place correctly as when, among other things, the trimming die is too dull or chips are broken out of the trimming die 201. As a consequence, the push rod 211 and ejection pin 210 can no longer complete the trimming process and eject the blank through the trimming die 201 nor is the compression in spring 218 adequate to effect the final ejection of the bolt blank BB from the holding die 208. Accordingly, the bolt blank BB remains either in the trimming die 201 or the holding die 208, usually the former due to the frictional engagement of the cut head with the interior of the die 201. As a result, when the conveying fingers next present another bolt blank to be trimmed the earlier retained and incompletely cut bolt blank will hit the new bolt blank with consequent damage to one or more of the finger conveyors, the trimming die, the holding die and other adjacent parts.

The present invention serves to prevent such damage as is caused by improperly trimmed bolt blanks. As just described the trimming operation takes place in two segments. In the first segment the movement of the main slide 205 and the trimming die 201 toward the right trims all but the very last portion of the bolt head until it reaches the position shown in FIG. 18. The second segment of the trimming takes place when the ejection pin 210 pushes the bolt blank out of the holding die 208 and through the trimming die 201 leaving behind the trimmed waste 219 which simply drops out of the machine after the trimming die 201 returns to the left in the figures.

It is the second segment of the trimming operation that serves as a means for detecting improperly trimmed blanks. This second segment of the trimming operation begins when the ejection pin 210 starts its stroke toward the left just subsequent to the position shown in FIG. 17 and ends when the ejection pin 210 has reached its most extreme leftward position as shown in FIG. 19. It is this movement of the ejection pin which the method and apparatus of this invention serves to monitor electronically. To this end a pulse generator 225 is provided which is driven by a belt 225' from the shaft 216 by suitable means such as a pulley 216'. However, since the shaft 216 operates in timed relationship with crank shaft 207 it is perfectly reasonable to drive the pulse generator 225 directly from the crank shaft 207. In either event the number of pulses emitted by the generator 225 will be in proportion to the number of degrees of rotation of the cam shaft 216 and cam 215. During the longitudinal reciprocating movement of the ejection pin 210 and pusher rod 211 in order for a perfectly trimmed product to be produced the trimming operation should begin when the cam 215 occupies the position I marked "start" in FIG. 20. The trimming operation must also be completed when the ejection pin 210 has reached its most extreme leftward position at which point the cam 215 must be in the position marked XIII "end" in FIG. 20. The electronic apparatus 220 registers the number of pulses received during the movement of the ejection pin 210 for use as more fully described hereinafter. In order for the electronic apparatus to measure such pulses between such limits it is necessary to provide a signal for the beginning and end of the movement of the ejection pin 210.

Figure 15:
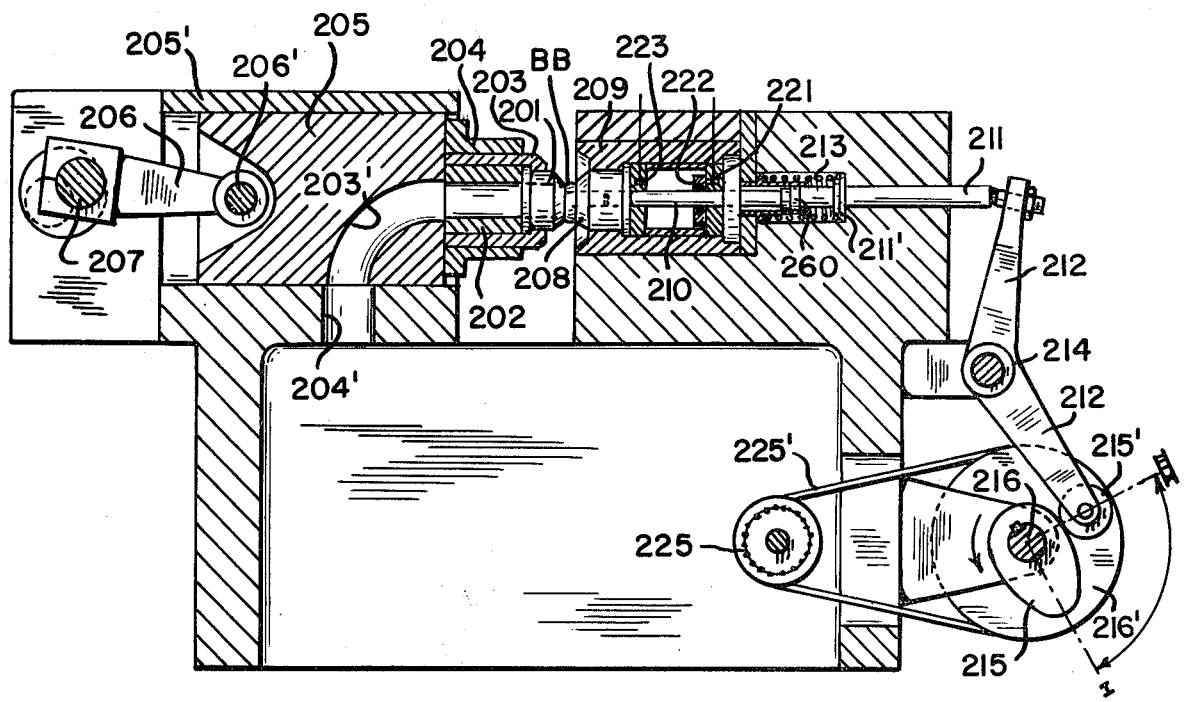
FIG. 15 is a vertical cross-section of a trimming machine to which the invention is applied with the parts shown in the positions which correspond to the beginning of the trimming process.
Figure 16:
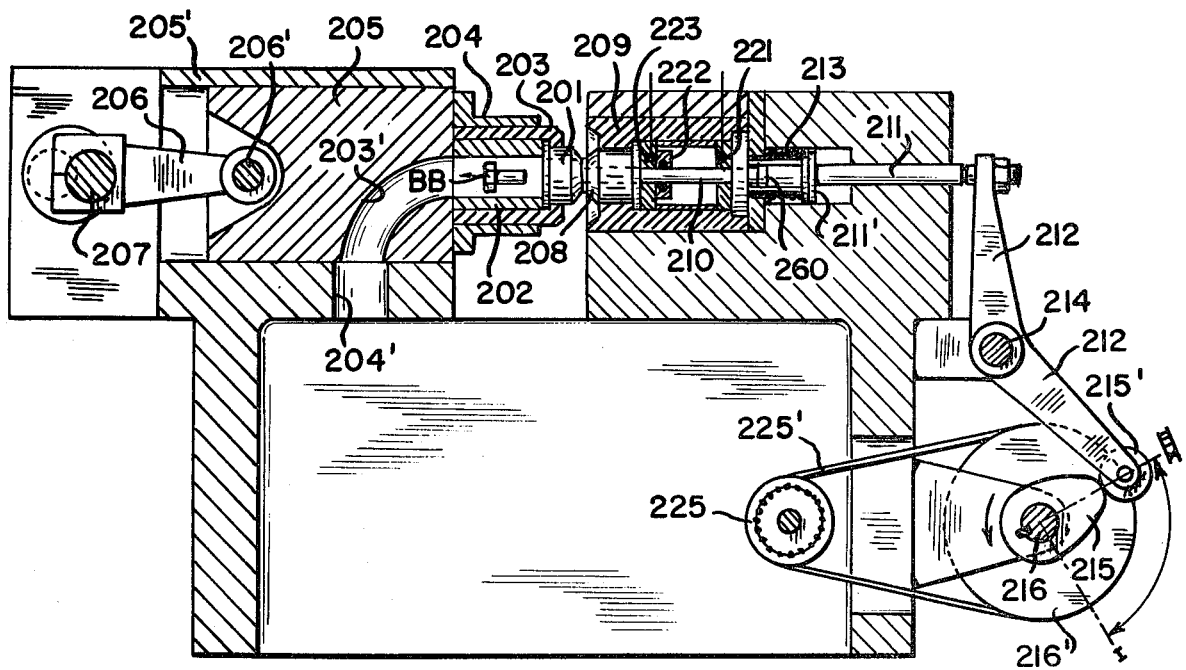
FIG. 16 corresponds to FIG. 15 showing the parts in position at the end of the trimming operation.

In order to register the start of the leftward movement of the ejection pin 210 a sensor 221 is provided which is mounted in the holder 209. The sensor 221 may be a microswitch or other suitable device for the purpose. A disc 222 resiliently mounted on the ejection pin 210 for movement therewith activates the sensor 221 by moving away from sensor 221 at the precise instant that the ejection pin 210 begins its movement toward the left. To register the end of the movement of the ejection pin 210 a second sensor 223 is also mounted in the holder 209. The sensor 223 may also be a microswitch or equivalent device. The distance between sensors 221 and 223 is such that the disc 222 will activate sensor 223 precisely when ejection pin 210 has reached the extreme leftward limit of its movement, thus completing the second portion of the trimming operation and ejection of the trimmed bolt blank BB. If the trimming operation is correct sensor 221 will be activated precisely when the cam 215 is in position I and sensor 223 will be activated precisely when cam 215 is in position 13. Positions I and 13 are shown in FIGS. 15 and 16 respectively.

Figure 20:
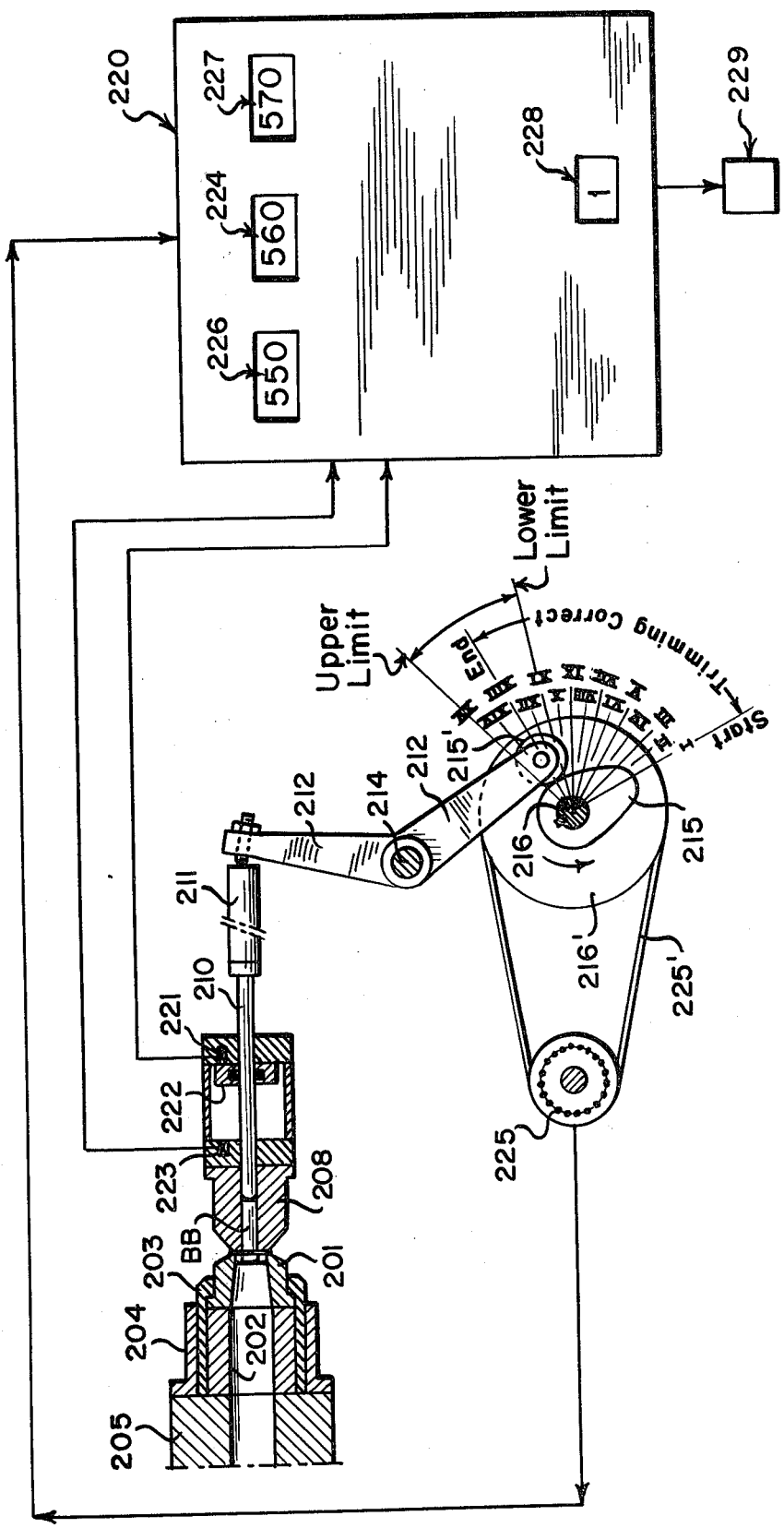
FIG. 20 is a schematic block diagram of the circuit of the invention and its association with the mechanical parts of the apparatus.

As with the electronic unit 16 discussed above with respect to a thread rolling machine application, the electronic apparatus 220 for use with the trimming machine has a number of presetting and registration possibilities. A thumbwheel switch and display 224 is provided which is preset to the number of pulses which should be received if the product is correctly trimmed. As shown in FIG. 20, this number of pulses is 560. That is to say that 560 pulses should be received from the particular pulse generator 225 between the time the sensor 221 is activated and the instant when the sensor 223 is activated by movement of the ejection pin 210 as above described. Another thumbwheel switch and display mechanism 226 is provided in which is set the minimum number of pulses that should be received and still have an acceptable product during the leftward movement of the ejection pin 210 between the time of activation of the sensor 221 and the activation of the sensor 223. As shown in FIG. 20, this number is 550 pulses. The number of pulses will fall below the ideal number set in the thumbwheel switch and display 224 when, due to maladjustment, wear or similar causes, the ejection pin 210 begins its leftward movement after the cam 215 has passed position I or when the ejection pin 210 reaches the extreme leftward position before the cam 215 has reached the position XIII. As long as this reduced number of pulses does not fall below the number set in the thumbwheel switch and display 226 the product is still acceptable.

Still another thumbwheel switch and display 227 is provided for setting and registering the maximum number of pulses generated by the pulse generator 225 and which result in acceptable product and which are generated between the activation of sensors 221 and 223 by the leftward movement of the ejection pin 210. As shown in FIG. 20, the number set is 570 pulses. The number of pulses emitted during the leftward movement of the ejection pin 210 between the time the sensor 221 is actuated and the time the sensor 223 is actuated will exceed the normal number set in the device 224, when the movement of the ejection pin 210 toward the left is begun before the cam 215 has reached the start position I or when the ejection pin 210 reaches its extreme leftward position and activates sensor 223 after the cam 215 has passed position XIII. However, as long as the number of pulses does not exceed the number preset in the thumbwheel switch and display 227 the product is still acceptable.

Still another thumbwheel switch and display device 228 is provided which is set to the number of incorrectly formed products which are acceptable in a given production run. If the number of incorrectly formed products exceeds the number preset in the device 228 then, in that event, a pulse is emitted to an electromagnet 229 which disconnects a certain portion of the machine such as the finger conveyor so that no new blanks are presented for trimming thus preventing damage to the machine. The electromagnet 229 may also be connected to the main power source for the trimming machine in order to turn it off completely. Additionally, a light, bell or other signal can be sounded to attract the attention of the operator. While the number of incorrectly formed products is shown as being 1 in FIG. 20 which indicates the number of incorrectly formed products in a production run, the device of 228 may be set to zero and, more commonly, would be set to zero in a trimming machine such as the one herein described.

A more detailed showing of the electronic circuitry is shown in FIG. 21 in which a circuit for a bolt machine is shown in which the bolt blank is first trimmed at a trimming station in the same manner as disclosed above with respect to the trimming machine of FIGS. 18–20 and then subsequently the same blank is thread rolled in a thread rolling machine such as one of those described above. In effect, the circuit for the thread rolling machine and the circuit for the trimming machine are substantially identical and operate in essentially the same manner and when the two are combined in one machine a circuit is provided for each as shown in FIG. 21, excepting only that a single pulse generator is all that is necessary and a presetting switch 236 is provided in the trimming circuitry to establish the correct time at which the trimming process must be stopped. As stated another way, the circuitry shown in the top half of FIG. 21 above the dashed line marked A is identical to that used in either of the two thread rolling machines described above, excepting that the leads L1 and L2 are not needed when the circuit is used only for a thread rolling operation or only for a trimming operation. The circuitry shown below the dashed line A in FIG. 21 is identical to that shown thereabove, excepting only that it does not include a counter for counting correctly formed products. It includes the aforementioned switch 236, and operates from the same pulse generator 18. Since the two machines are operating as a unit and the thread rolling is the last accomplished only one counter for properly produced products is necessary. Further, since the trimming machine and the thread rolling machine are operated in a bolt machine from the same main shaft such as the shaft 7 of FIG. 1 which may be connected to or merely an extension of crank shaft 207 in FIG. 15, there is need for only a single pulse generator. For this reason, the reference numbers of elements above the line A in FIG. 21 correspond to the numbers used in describing the circuit of FIG. 14 (thread rolling machine) and the reference numbers below the line A in FIG. 21 correspond to the numbers for the circuit elements of FIG. 20 (trimming machine).

As indicated in FIG. 21, the pulses generated by the pulse generator 18 pass through level detector 18a to counters 25 and 230 as well as to logic circuits 27 and 231. In the thread rolling portion of the bolt making machine the sensor 12 is activated at the start of the thread rolling process as above described and emits a pulse which passes through level detector 12a and from thence to counter 25, a delay circuit 28 and presetting switch 37. From the delay circuit 28 the pulse is fed to the logic circuit 27. At the end of the thread rolling process the EPD switch 15 is activated as above described and emits a pulse which passes through the level detector 15a and from thence to the memory 17, the logic circuit 27, and statistical control 21. The number of pulses counted by the counter 25 between the activation of EPD switch 12 and the activation of EPD switch 15 is then compared to the values set in the lower limit memory switch 19 and upper limit memory switch 20 which switches 19 and 20 process the same for the logic circuit 27. The logic circuit 27 that determines whether the value of pulses counter by counter 25 indicates a correctly threaded product (the number of pulses falls between the preset values in the memory switches 19 and 20) or whether the number of pulses falls outside of the limits set in memory switches 19 and 20. If the number of pulses counted by counter 25 falls within the acceptable limits the logic circuit emits a pulse to a power amplifier 29 which in turn amplifies the pulse and presents it to counter 30 for the counting of correctly formed products. On the other hand, if the logic circuit 27 finds that the number of pulses counted by the counter 25 falls outside of the limits established in the memory limit switches 19 and 20 then, in that event, it emits a pulse to the power amplifier 31 and to the statistical control 21. From the power amplifier 31 the amplified pulse is fed to a switching unit 22 to activate gate 23 and discharge the product down chute 24. A delay is incorporated in the power amplifier 31 in order to insure sufficient time for the malformed product to pass the gate 23 and enter well into the chute 24 before a reset is established by resetting switch 33. When the statistical control 21 receives a pulse indicating a malformed product it counts the same and compares with the acceptable limit of malformed products preset in thumbwheel switch 21a. If the number of malformed products produced does not exceed the preset value then, in that event, the statistical control does nothing further; however, in the event that the number of malformed products exceeds the acceptable limit set in thumbwheel switch 21a then, in that event, the statistical control 21 emits a pulse to signal 32 to attract the attention of an operator or shut down the machine, or both. Reset switch 33 serves to reset the signal 32, if necessary, power amplifier 31 and switch unit 22.

While the thread rolling portion of the circuit of FIG. 21 has been described first it will be appreciated that both the thread rolling circuit and the trimming circuit are operating over the same time span to control the thread rolling section and the trimming section respectively of a bolt making machine. In actual fact a bolt is first trimmed in the trimming section of the bolt making machine and then threaded in the thread rolling section; however, while one bolt is being thread rolled a succeeding bolt is being trimmed.

The trimming portion of the circuit of FIG. 21 operates in much the same manner as the thread rolling portion, excepting that switch 236 is provided. The switch 236 is operated by hand when the combined bolt making machine is being set up and the switch 236 is preset by hand to determine the correct instant for starting the trimming operation. Switch 236 is in the down position shown in FIG. 21 during the trimming process and is in the up position the rest of the time. As will be apparent the counter counts the pulses emitted by the counter 18 after activation of the EPD switch 221 and before the activation of the EPD switch 223. The logic circuit 231 compares this value to the lower and upper limits established in the memory switches 226 and 227 and if the same falls within the prescribed limits it does nothing further since there is no point in counting good products produced at this point in the combined machine. However, when the circuit is used on a trimming machine alone a power amplifier and counter such as power amplifier 29 and counter 30 may be connected to the logic circuit 231 for activation thereby when a good product is produced. When the number of pulses of the generator 18 counted by the counter 230 fall outside of the limits prescribed and set by memory switches 226 and 227 then in that event the logic circuit 231 emits a pulse to power amplifier 232 and to statistical control unit 228. The amplified pulse from power amplifier 232 activates switching unit 229 which shuts off part or all of the trimming section of the bolt making machine. The pulse received by statistical control 228 is compared with the limit that is acceptable as preset in thumbwheel switch and display 228a which most often will be set to zero for this particular operation though it may be set at a higher value. In the event that the number of malformed products counted by statistical control 228 exceeds the limit set into thumbwheel switch 228a then, in that event, statistical control 228 emits a pulse to signal 234 to attract the attention of an operator. The reset switch 233 serves to reset signal lamp 234, power amplifier 232 and switch unit 229. The level detectors serve to bring the electronic controlling elements into condition ready for operation. For example, level detectors 12a and 238 serve to hold the start switches 12 and 221 respectively in a standby position ready for activation.

I claim:

1. A method for detecting and signalling inaccurately formed articles produced on a tool machine having a stationary machining tool and a cooperating movable machining tool which act upon the article to form the same and which tool machine includes a rotary drive for moving said movable machining tool and in which the degree of movement of said movable machining tool is indicative of the acceptable or unacceptable quality of the article produced, said method comprising generating a number of electrical pulses from said rotary drive proportional in number to a given angle of rotation of the drive mechanism, generating a signal at the start of movement of said movable machine tool, generating a signal at the completion of movement of said movable machine tool, setting a prescribed upper and lower limit for the pulses generated corresponding to acceptable limits of movement of said movable machine tool, counting the number of pulses generated in the interval between the time of generation of the signal at the start of movement of said movable machine tool to the time of generation of the signal upon completion of the movement of the movable machine tool, comparing the number of pulses received and counted in said interval to the pre-set upper and lower acceptable pulse limits, determining whether the number of pulses counted falls within or without the prescribed limits, and generating a signal in all instances when the number of counted pulses falls outside the prescribed limits.

2. The method of claim 1 including establishing a total number of acceptable inaccurately formed articles for a given production run of articles, counting the number of inaccurately formed articles produced, and generating a signal when the number of inaccurately formed articles exceeds the prescribed limit in any given production run.

3. An apparatus for detecting and signalling inaccurately formed articles produced on a tool machine, said tool machine having a stationary machining tool, a cooperating movable machining tool, a rotary drive for moving said movable machining tool and in which the degree of movement of said movable machining tool is indicative of the acceptable or unacceptable quality of the article produced by said apparatus, comprising means for generating a number of electrical pulses from said rotary drive proportional in number to a given angle of rotation of the drive mechanism, means for generating a signal at the completion of movement of said movable machine tool, setable memory means for receiving and holding in memory an upper and a lower limit for the pulses generated corresponding to acceptable limits of movement of said movable machine tool, means for counting the number of pulses generated in the interval between the time of generation of the signal at the start of movement of said movable machine tool to the time of generation of the signal upon completion of the movement of said movable machine tool, means for comparing the number of pulses received and counted in said interval to the pre-set upper and lower acceptable pulse limits in said memory means, means for determining whether the number of pulses counted by said counting means falls within or without the prescribed limits, and means for generating a signal in all instances when the number of counted pulses falls outside the prescribed limits.

4. The apparatus of claim 2 including additional presetable means for receiving and holding in memory the total number of acceptable inaccurately formed articles for a given production run, means for counting the number of inaccurately formed articles in a given production run, means for comparing the number of inaccurately formed articles counted to the pre-set acceptable limit, and means for generating a signal whenever the number of inaccurately formed articles exceeds the pre-set acceptable limit.

5. The apparatus of claim 3 in which the stationary machining tool and movable machining tool are thread rolling dies.

6. The apparatus of claim 3 in which said tool machine is a trimming machine, including a trimming die, said stationary machining tool is a holding die, and said cooperating movable machining tool is an ejection pin for ejecting a partially trimmed article from said holding die and into said trimming die to complete the trimming operation and eject the article from the machine.

7. The method of claim 1 including rejecting the article produced in response to said generated signal.

8. The apparatus of claim 3 including means for rejecting the article produced, said rejecting means being responsive to reject an article only when said signal is generated.

* * * * *